(12) United States Patent
Homsi (10) Patent No.: US 10,392,827 B2
(45) Date of Patent: Aug. 27, 2019

(54) WIND TOWER ERECTION SYSTEM (71) Applicant: Parsons Corporation, Pasadena, CA (US)

(72) Inventor: Elie Habib Homsi, Broomfield, CO (US)

(73) Assignee: Parsons Corporation, Pasadena, CA (US)

( * ) Notice: Subject to any disclaimer, the term of this patent is extended or adjusted under 35 U.S.C. 154(b) by 0 days.

(21) Appl. No.: 15/905,311

(22) Filed: Feb. 26, 2018

(65) Prior Publication Data
US 2018/0187446 A1 Jul. 5, 2018

Related U.S. Application Data (62) Division of application No. 14/632,757, filed on Feb. 26, 2015, now Pat. No. 9,388,599.

(60) Provisional application No. 61/945,619, filed on Feb. 27, 2014.

(51) Int. Cl.
| | |
|---|---|
| *E04H 12/34* | (2006.01) |
| *B66C 1/10* | (2006.01) |
| *F03D 13/10* | (2016.01) |
| *F03D 13/20* | (2016.01) |

(52) U.S. Cl.
CPC ........... *E04H 12/345* (2013.01); *B66C 1/108* (2013.01); *E04H 12/34* (2013.01); *F03D 13/10* (2016.05); *F03D 13/20* (2016.05); *F05B 2230/61* (2013.01); *Y02E 10/721* (2013.01); *Y02E 10/728* (2013.01); *Y02P 70/523* (2015.11)

(58) Field of Classification Search
CPC ....... E04H 12/34; E04H 12/345; F03D 13/10; F03D 13/20; Y02E 10/728; F05B 2230/61; B66C 1/108
See application file for complete search history.

(56) References Cited

U.S. PATENT DOCUMENTS

| | | |
|---|---|---|
| 2,363,106 A | 11/1944 | Woolslayer et al. |
| 2,787,385 A | 4/1957 | Campbell |
| 2,863,530 A | 12/1958 | Woolslayer et al. |
| 2,903,102 A | 9/1959 | Woolslayer et al. |
| 3,575,300 A | 4/1971 | Durand |

(Continued)

FOREIGN PATENT DOCUMENTS

| | | |
|---|---|---|
| CN | 101590982 B1 | 12/2009 |
| DE | 3337911 A1 | 5/1985 |

(Continued)

OTHER PUBLICATIONS

Parsons Construction Group, "Manufacturing and Supply Chain Barriers and Opportunities for Wind Technologies," DE-FOA-0000929, CFDA No. 81.087, Jun. 30, 2013.

(Continued)

*Primary Examiner* — Andrew J Triggs
(74) *Attorney, Agent, or Firm* — Jeffrey G. Sheldon; Katherine B. Sales; Cislo & Thomas LLP (57) ABSTRACT

Tall wind towers can be erected using a mobile tilting frame comprising a major gin pole and a minor gin pole having a longitudinal axis. The tilting frame has a support cable connecting the major/minor gin poles. The minor gin pole can pivot relative to the major gin pole so that the longitudinal axis of the minor gin pole can be perpendicular to the longitudinal axis of the major gin pole.

22 Claims, 13 Drawing Sheets

(56) References Cited

U.S. PATENT DOCUMENTS

| | | | |
|---|---|---|---|
| 3,747,695 A | 7/1973 | Branham | |
| 3,789,565 A | 2/1974 | Lindholm | |
| 4,221,088 A | 9/1980 | Patterson | |
| 4,364,710 A | 12/1982 | Campbell | |
| 4,522,564 A * | 6/1985 | Carter, Jr. | F03D 1/0608 |
| | | | 416/11 |
| 4,587,778 A | 5/1986 | Woolslayer et al. | |
| 4,831,795 A | 5/1989 | Sorokan | |
| 5,252,029 A | 10/1993 | Barnes | |
| 6,782,667 B2 * | 8/2004 | Henderson | E04H 12/182 |
| | | | 52/116 |
| 6,868,646 B1 | 3/2005 | Perina | |
| 8,011,098 B2 | 9/2011 | Vorhies et al. | |
| 8,069,634 B2 * | 12/2011 | Livingston | F03D 13/10 |
| | | | 52/120 |
| 8,601,748 B2 | 12/2013 | Delago et al. | |
| 9,388,599 B2 * | 7/2016 | Homsi | E04H 12/345 |
| 2002/0095878 A1 * | 7/2002 | Henderson | E04H 12/182 |
| | | | 52/116 |
| 2008/0078128 A1 | 4/2008 | Livingston et al. | |
| 2010/0124506 A1 * | 5/2010 | Richartz | F03D 1/0675 |
| | | | 416/241 R |
| 2010/0212236 A1 | 8/2010 | Bourdages | |
| 2010/0236161 A1 | 9/2010 | Livingston et al. | |
| 2011/0016804 A1 * | 1/2011 | Howard | E04H 12/20 |
| | | | 52/146 |
| 2011/0168654 A1 | 7/2011 | Ahler et al. | |
| 2011/0179623 A1 | 7/2011 | Smith et al. | |
| 2013/0074564 A1 | 3/2013 | Smith et al. | |
| 2015/0240512 A1 * | 8/2015 | Homsi | E04H 12/345 |
| | | | 52/745.18 |
| 2016/0305147 A1 * | 10/2016 | Homsi | E04H 12/345 |

FOREIGN PATENT DOCUMENTS

| | | |
|---|---|---|
| DE | 19741988 A1 | 4/1994 |
| DE | 19647515 B1 | 5/1998 |
| EP | 1857670 B1 | 7/2011 |
| GB | 738195 A1 | 10/1955 |
| GB | 738198 A1 | 10/1955 |
| GB | 747245 | 3/1956 |
| GB | 751826 A1 | 7/1956 |
| GB | 760186 | 10/1956 |
| GB | 765363 A1 | 1/1957 |
| GB | 1173524 A1 | 12/1969 |
| JP | 62282178 A1 | 12/1986 |
| JP | 3135550U B1 | 9/2007 |

OTHER PUBLICATIONS

USPTO, Office Action on the Merits issued in parent U.S. Appl. No. 14/632,757 dated Nov. 17, 2015 (14 pages).

USPTO, Office Action Summary dated Sep. 25, 2017 for U.S. Appl. No. 15/194,236, 8 pages.

USPTO, Office Action Summary dated Apr. 27, 2017 for U.S. Appl. No. 15/194,236, 13 pages.

\* cited by examiner

WIND TOWER ERECTION SYSTEM

CROSS-REFERENCE TO RELATED APPLICATIONS

The present Application is divisional of U.S. patent application Ser. No. 14/632,757, titled "Wind Tower Erection System," filed Feb. 26, 2015, which claims the benefit of U.S. Provisional Patent Application No. 61/945,619, titled "Wind Tower Erection System," filed Feb. 27, 2014, the contents of which are incorporated herein by reference in their entirety.

BACKGROUND

Wind towers are effective in harnessing energy without consumption of fossil fuels. Generally the taller the wind tower the more efficient it is. Typically, wind towers are 60-80 meters in height.

It is desirable for efficiency to have taller wind towers. However, as a wind tower gets taller, it is necessary that the base be of larger diameter. The diameter of a wind tower base is limited when the wind tower is manufactured off site by freeway underpass clearances. At larger diameter bases, it is not practical to transport the base portion of a wind tower by truck through a highway system.

Another limit on the height of wind towers is the size of a crane necessary to erect the wind tower on site.

Technology is being developed so that a wind tower of increased height can be constructed on site so that the transportation limit on wind tower size can be avoided. For example, see Keystone U.S. Patent Publication Nos. 2011/0179623 and 2013/0074564. However, there remains the challenge of erecting a tall wind tower, particularly when the height is 100 meters or higher. Moreover, with very tall wind towers it is difficult to repair or replace the turbine, or major components such as bearings, rotors, and blades and upper portion of the wind tower. It is expensive to bring in a crane to access the top of a tall wind tower, even if such a crane is available. Although minor repairs can be made by a worker climbing the wind tower, if it is necessary to completely replace the turbine or blades or upper portion of the tower, that is not practical for very high wind towers, and the investment in the wind tower can be lost. Current technologies to build or assemble higher towers on site and in position exists (cast in place concrete, precast concrete components, slip forming); however, these methods are too slow and expensive to achieve the desired economic viability to make wind energy economical.

Accordingly, there is a need for a system for erecting and repairing tall wind towers on site.

SUMMARY

The present invention provides a system that satisfies this need. The system includes a method for erecting a wind tower having turbine and at least one blade. A preferred method can comprise the following steps, not necessarily in the order presented:

A. Building a foundation for the wind tower;
B. Providing a pivot base for the wind tower; and
C. Providing a wind tower support structure. Preferably the support structure is made on site, but it can be made off site. The support structure has a longitudinal axis substantially parallel to the ground, the support structure having a base section and a distal turbine section for supporting the turbine and blade.

The method can include the following additional steps:

D. Attaching the base section of the wind tower to a pivot base so that the support structure can be pivoted to a vertical position;
E. Attaching the turbine and the blade to the distal section of the support structure;
F. Moving a mobile tilting frame proximate to the pivot base and connecting the tilting frame to the pivot base, the tilting frame comprising a major gin pole having longitudinal axis and a minor gin pole having a longitudinal axis. The tilting frame has a first support cable connecting the major and minor gin poles. The minor gin pole optionally can pivot relative to the major gin pole;
G. Connecting the minor gin pole to an anchor with a second support cable. The anchor can be an anchor formed for this purpose, or can be the foundation of another wind tower as part of a wind tower farm;
H. Tilting the tilting frame so that the major gin pole is substantially vertical, wherein the longitudinal axis of the minor gin pole is at an angle relative to the longitudinal axis of the major gin pole;
I. Securing at least one tilting cable to the major gin pole and the tower support structure and thereafter pivoting at least a portion of the wind tower to a substantially vertical orientation using the tilting frame;
J. Locking the wind tower in its substantially vertical position;
K. Disconnecting the tilting cable from the major gin pole and pivoting the tilting frame to a position so that the longitudinal axis of the tilting frame major gin pole is substantially parallel to the ground; and
L. Moving the tilting frame away from the pivot base.

The invention also includes the mobile tilting frame itself and using the tilting frame for lowering a wind tower for repair or replacement of parts.

In one method of the invention, one can secure a pivot base to the support structure, the foundation, or a separate foundation. Furthermore, in step (E) the turbine and blade can be attached before or after tilting of the tilting frame of step (H). The base section can be attached pivotally with a pivot pin. The wind tower can be locked into place with either a pin or bolts. The method of the invention can be used to erect towers at least 150 meters tall. Furthermore, cables can be attached to the tower and support structure to stabilize these structures. Lastly, the method can be reversed to easily tilt the tower down for major turbine repairs, rebuild, replacement and upgrades.

Furthermore, the method can comprise the use of more than one major gin pole for very high towers. This configuration comprises at least a first and second major gin poles each having a longitudinal axis; a minor gin pole having a longitudinal axis; a first support cable connecting the first major gin pole and the minor gin pole; and a second support cable connecting the first and second major gin poles. In one aspect, the second major gin pole is greater in length than the first major gin pole, and each additional major gin pole is longer than the preceding gin pole, i.e., major gin pole 4 is longer than major gin pole 3 which is longer than major gin pole 2. In this configuration, the tilting of the tilting frame and erection of the wind tower is accomplished in the same manner as described above for a two-stage gin pole configuration.

DRAWINGS

These and other features, aspects, and advantages of the present invention will become better understood with regard to the following description, the features specified below, and the accompanying drawings where.

DESCRIPTION

A system according to the present invention is particularly useful for erecting tall wind towers and is described in detail for that purpose. However it can be used for other applications such as erecting antennas, oil drills and other tall, elongated, relatively narrow structures.

Figure 16:
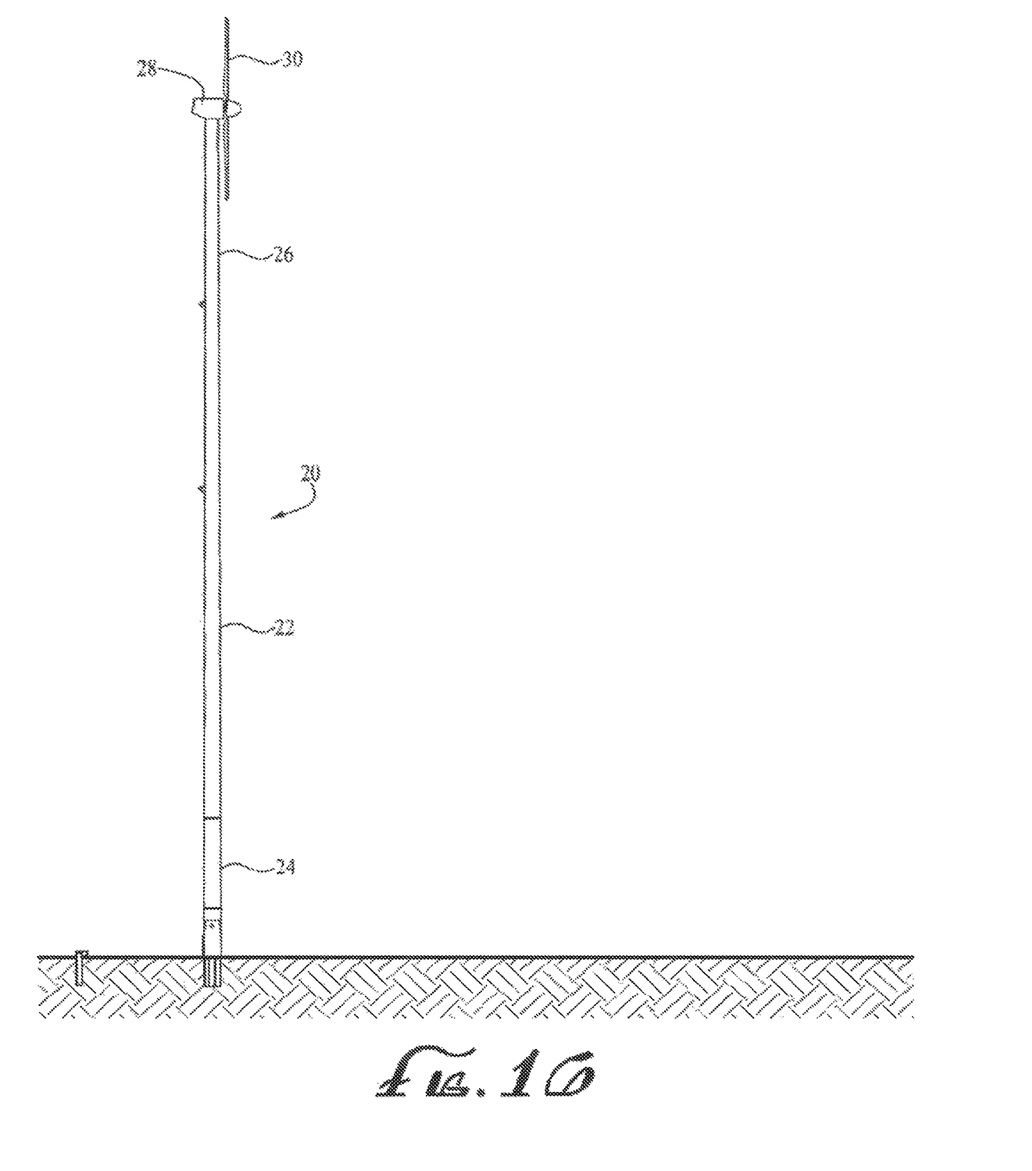

As shown in FIG. 16, a conventional wind tower 20 comprises an elongated support structure 22 having a base section 24 and a distal turbine section 26 on which is mounted a turbine 28 with blades 30. A typical wind tower is about 60-80 meters in height, and the present invention can be used with conventional wind towers. However, the invention is particularly useful for tall wind towers, such as those 150 meters and taller, particularly wind towers 180 meters and taller. The base section 24 for such tall towers is typically from about 5 meters to 10 meters in diameter or larger.

Figure 1:
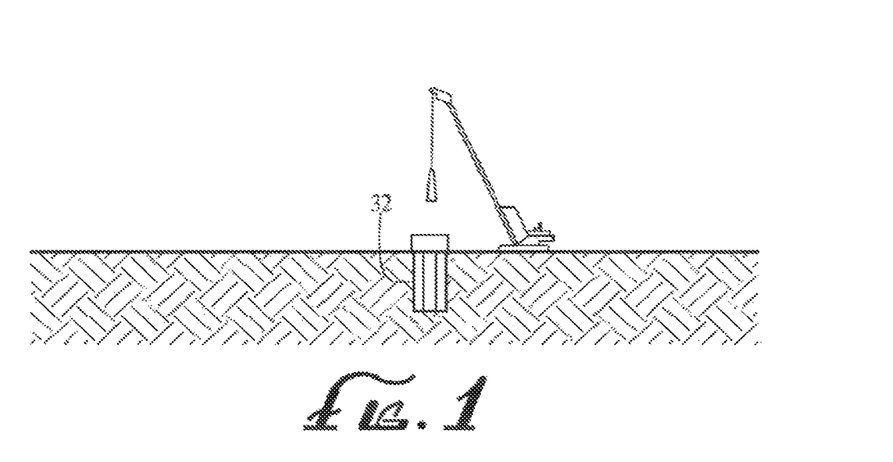
FIGS. 1-16 schematically demonstrate a preferred method of erecting a wind tower according to a system having features of the present invention, wherein the steps need not necessarily be performed in the order shown in the figures and not all of the steps need be performed.
Figure 2:
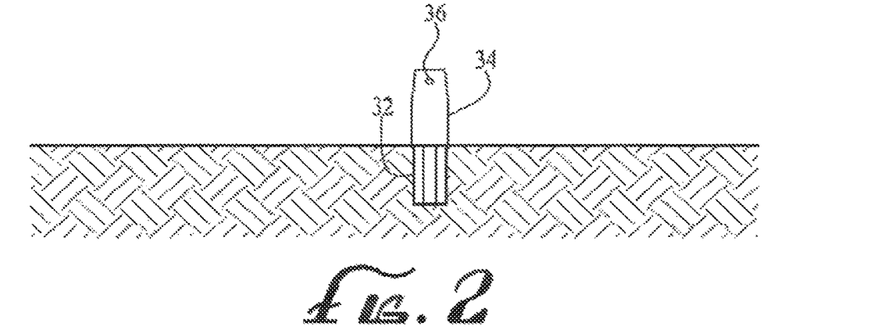

With reference to FIG. 1, a foundation 32 for the wind tower 20 is formed in a conventional manner. Typically, at least a portion of the foundation 32 is below ground level. Thereafter, as shown in FIG. 2, a pivot base 34 is secured to the foundation 32. Optionally, the pivot base 34 can be built into the support structure 22. The pivot base 34 preferably is provided with multiple holes, schematically represented by a single hole 36, for receiving a pivot pin 37 (FIG. 5) and one or more locking pins as described below.

Figure 3:
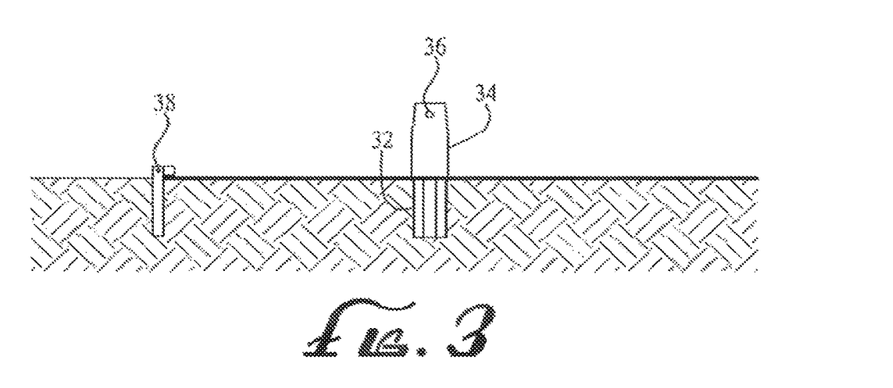

With reference to FIG. 3 an anchor 38 is provided. Optionally the base or foundation of another wind tower can be used as an anchor.

Figure 4:
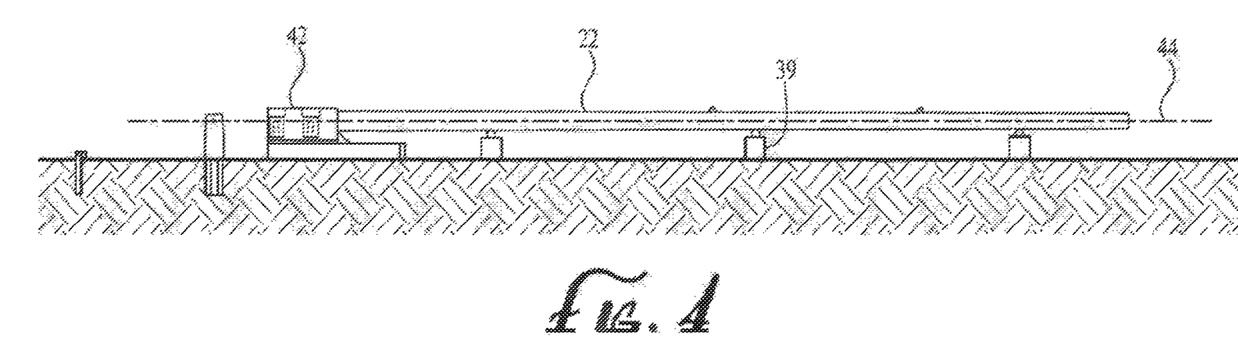

With reference to FIG. 4, the support structure 22 is initially provided oriented parallel, or close to parallel, to the ground and supported by support brackets 39 or the like. The support structure 22 can be fabricated on site, can be fabricated off site and transported to the erection site, or can be fabricated in segments fabricated off site and transported to the erection site and assembled on site. Preferably the support structure 22 is formed on site with a machine 42 such as using the technology described in the aforementioned Keystone published patent applications. The elongated support structure 22 has a longitudinal axis labelled as reference number 44 in FIG. 4.

Figure 5:
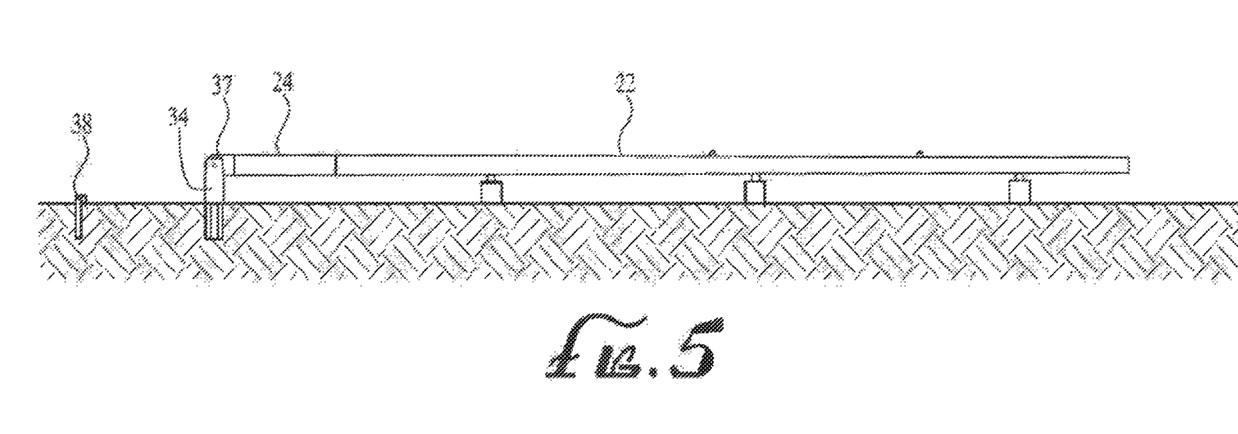

As shown in FIG. 5, the base section 24 of the support structure 22 is secured to the pivot base 34 using a pivot pin (not shown), so that the support structure 22 can be pivoted to a vertical position.

Figure 6:
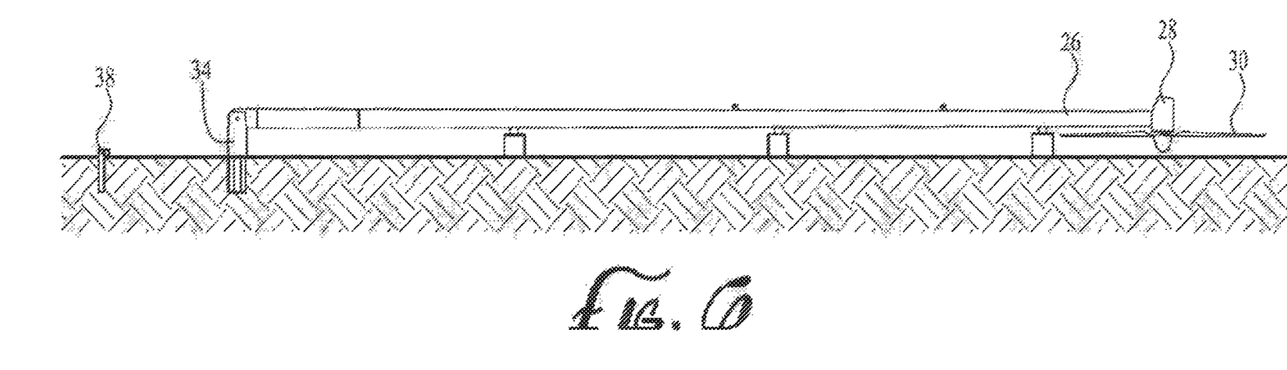

As shown in FIG. 6, the turbine 28 and blades 30 are then secured to the distal section 26 of the support structure 22. This step need not be performed in this sequence, in that the turbine and blade can be installed prior to attachment of the support structure to the pivot base or after some of the following steps. Preferably the turbine 28 and blades 30 are secured to the support structure 22 while the support structure 22 is easily accessible by being substantially parallel to the ground. However they can be secured after the support structure 22 is tilted to its vertical position or during the tilting process.

Figure 7:
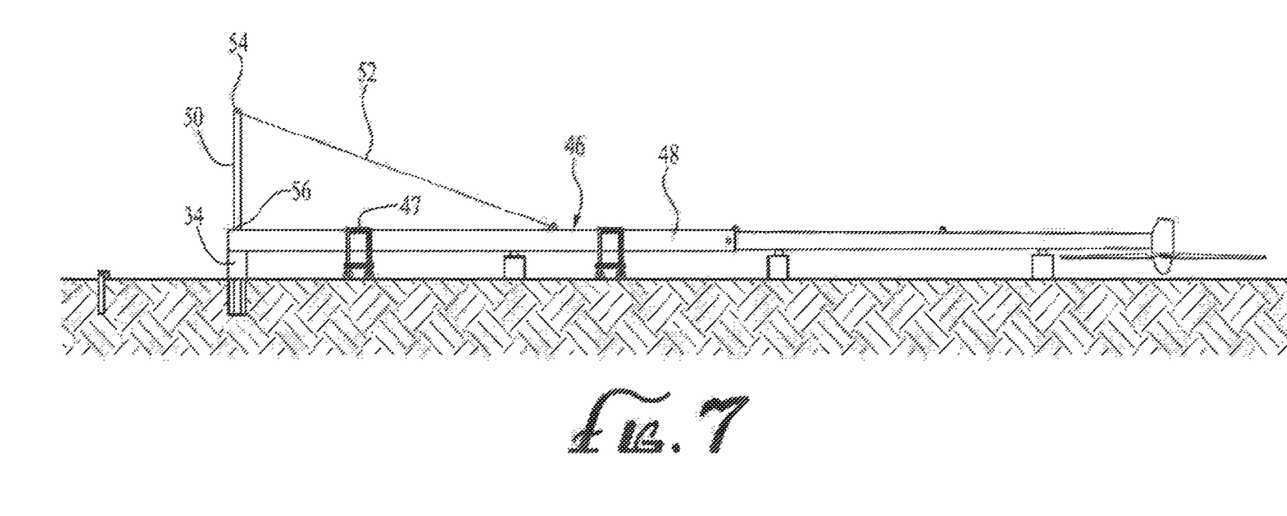

As shown in FIG. 7, a mobile tilting frame 46 is moved proximate to the pivot base 34, the frame 46 typically being supported on and moved into place on dollies 47 or straddle cranes. The mobile tilting frame 46 can have its own built-in wheels rather than rely on separate dollies 47 for movement.

Figure 8:
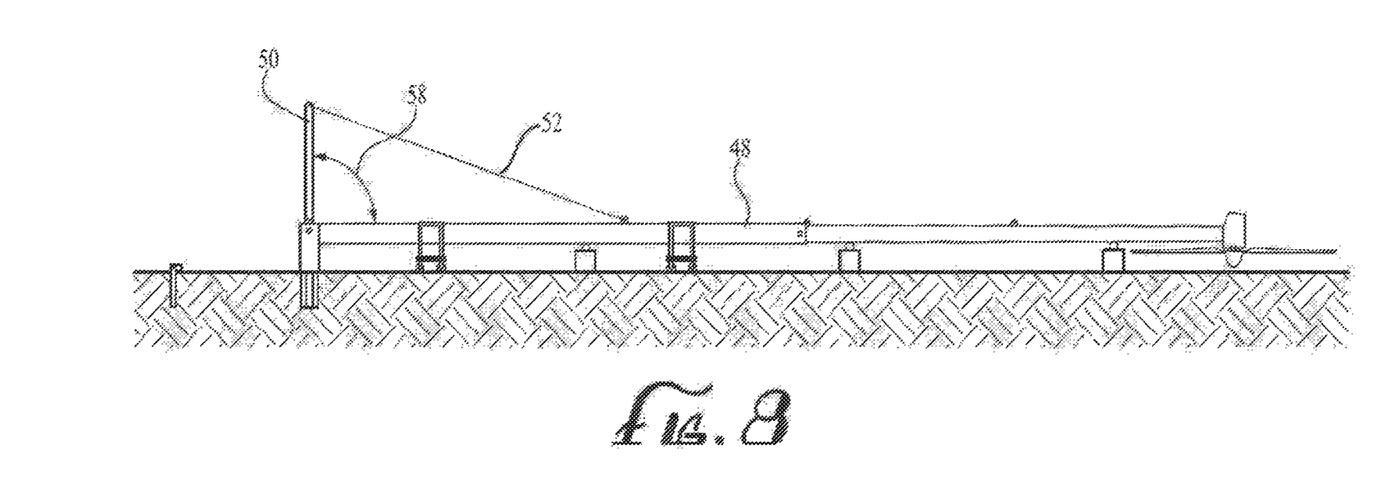

The mobile tilting frame 46 comprises a major gin pole 48 and a minor gin pole 50 connected by at least one, and preferably a plurality of first support cables 52 where one end of the support cables is attached to a first end 54 of the minor gin pole 50 and the other end of the support cables 52 is attached to the major gin pole 48 at a location between its ends. The minor gin pole 50 is used to tilt up and stabilize the major gin pole 48, and the major gin pole 48 is used to tilt up and stabilize the tower (FIG. 8). A second end 56 of the minor gin pole 50 is pivotally secured to the end of the major gin pole 48 that is proximate to the pivot base 34. Generally, the longitudinal axis of the minor gin pole 50 is perpendicular to the longitudinal axis of the major gin pole 48, although that angle 58 (see FIG. 8) can be from about 45 degrees to about 120 degrees. The tilting frame 46 is secured to the pivot base 34 so that it can be pivoted so that the major gin pole 48 can be substantially vertical.

The term "mobile" means a structure that is capable of being moved readily and is not a portion of the wind tower structure or the foundation structure.

The length of the major gin pole 48 is typically about 10% to about 50%, and preferably about 15% to about 25% of the length of the support structure 22. The length of the minor gin pole 50 is typically about 10% to about 50% of the length of the major gin pole 48.

Figure 9:
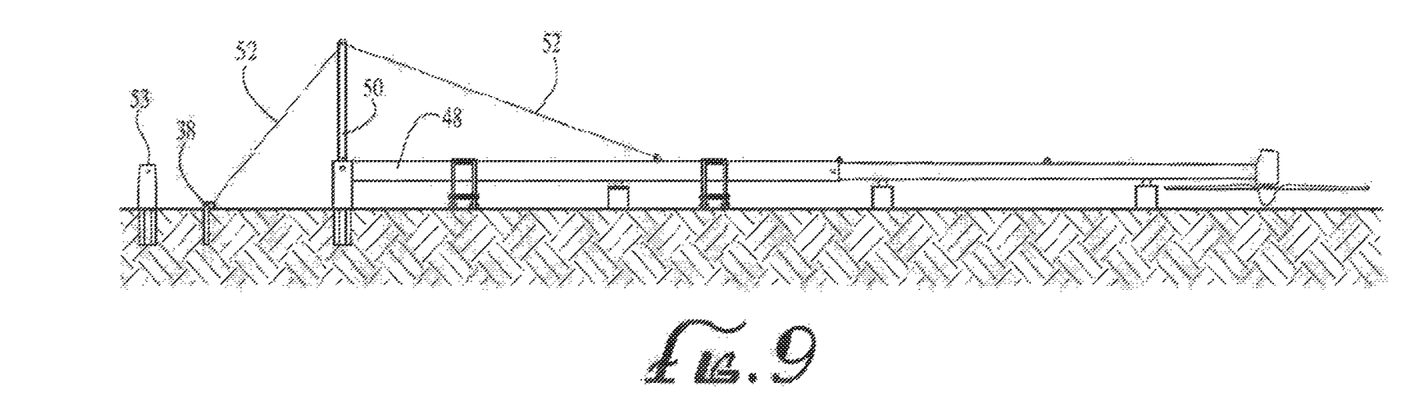

With reference to FIG. 9, the minor gin pole 50 is secured to the anchor 38 with a second support cable 52, and typically multiple cables. Wherever a cable is referred to herein, generally multiple cables are used, both to provide increased strength, and also to prevent undesired tilting of the structures to which the cables are attached.

Figure 10:
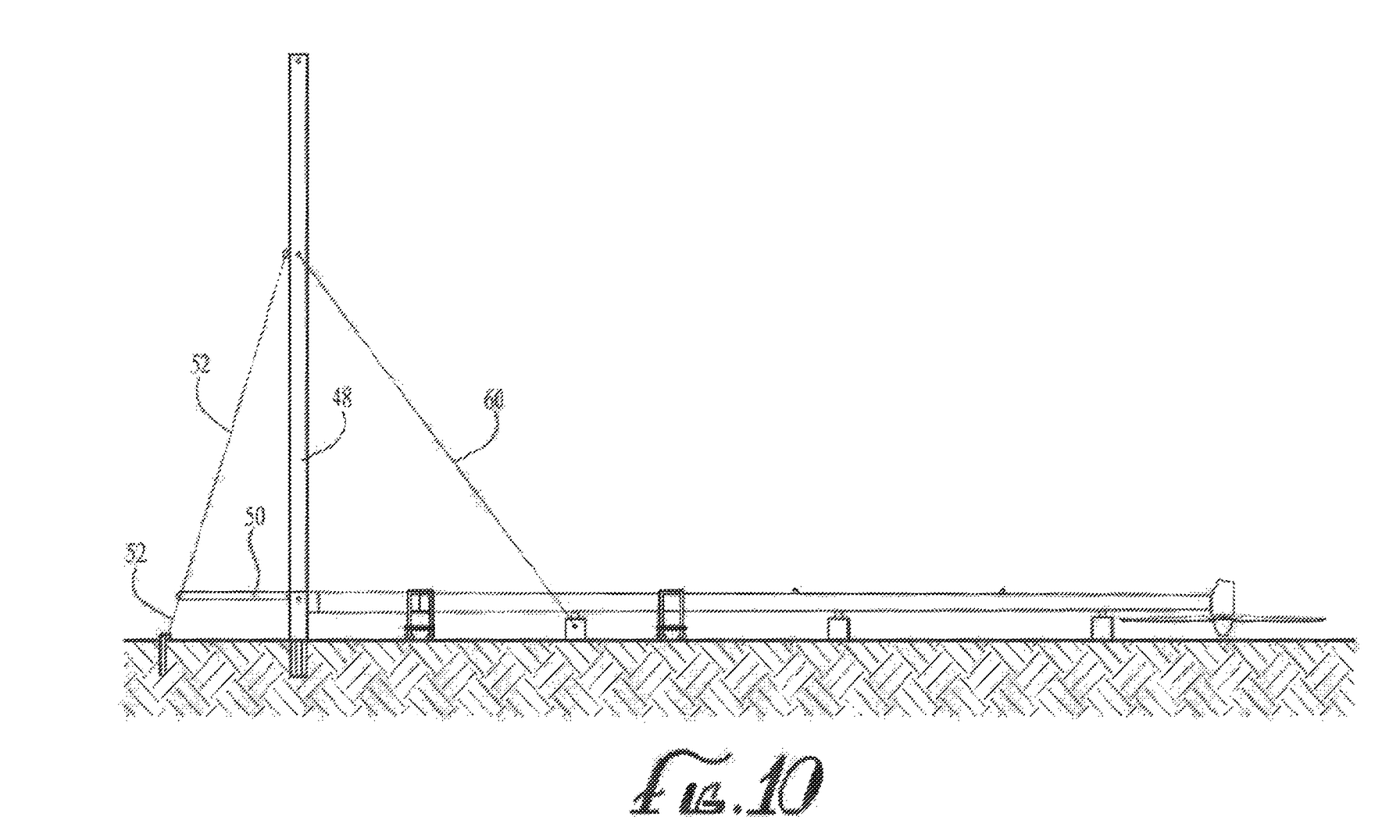

As shown in FIG. 10, the mobile tilting frame 46 is then tilted so that the major gin pole 48 is substantially vertical, or can even be tilted beyond the vertical position. Tilting is effected with a tilting power system typically comprising a winch and a motor for driving the winch (not shown). The tilting power system can comprise hydraulic jacks, or a winch and motor in combination with hydraulic jacks. The tilting power system can be part of the mobile tilting frame 46, or it can be a separate structure such as being placed by the anchor 38. Stabilizing cables 60 are used to secure the tilting frame 46.

Figure 11:
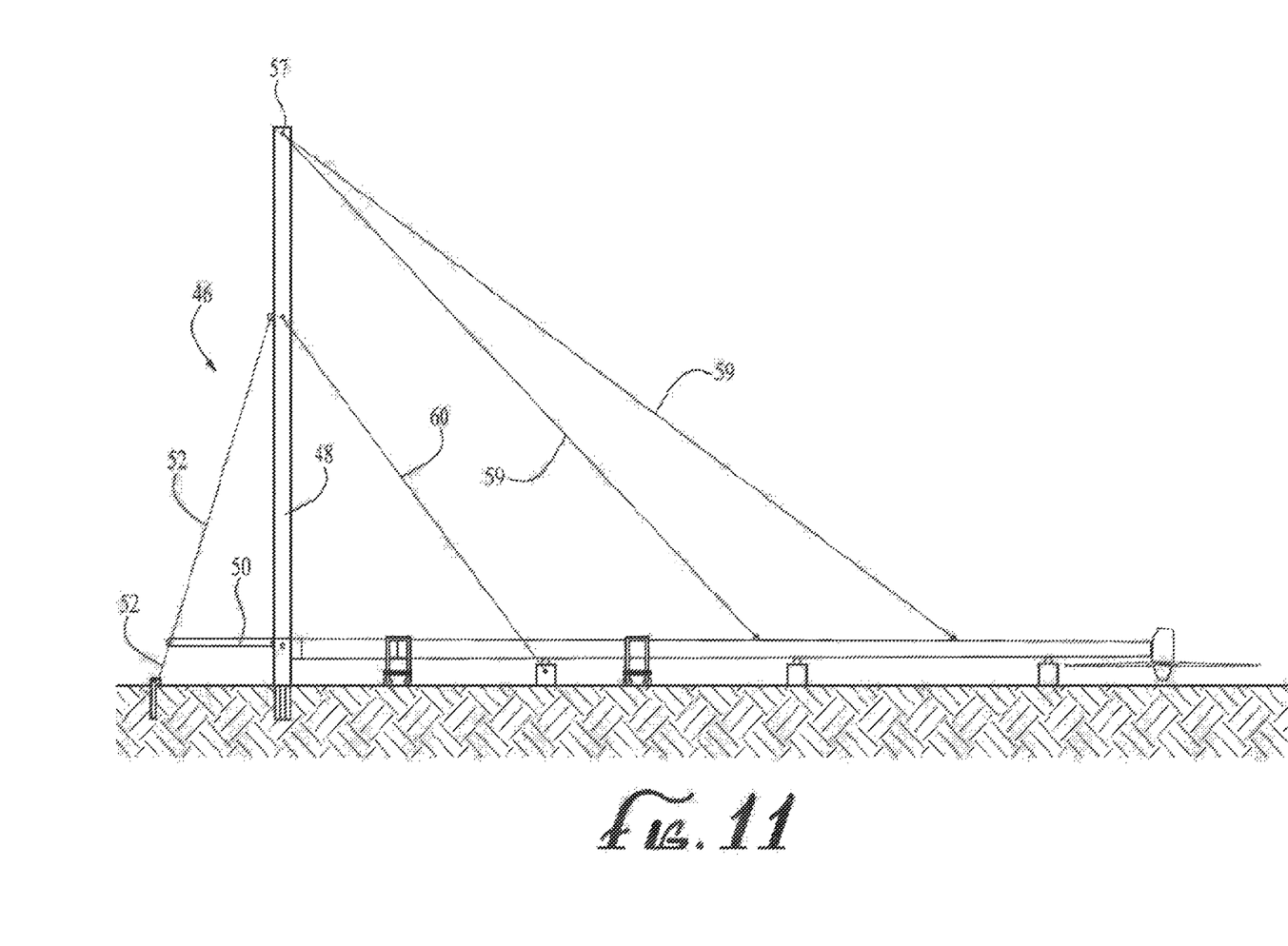
Figure 12:
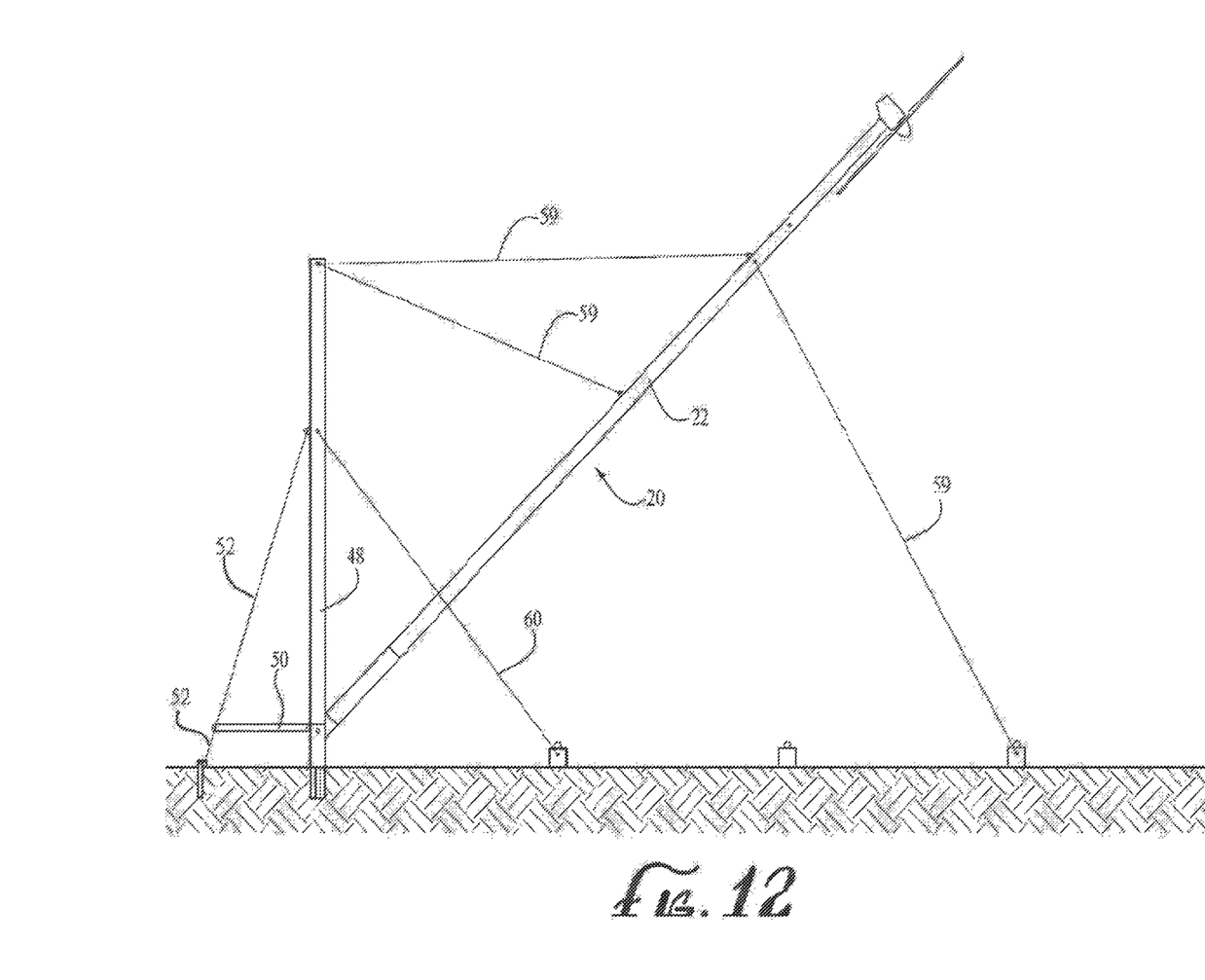

As shown in FIG. 11, the major gin pole 48 is connected to the support structure 22 by a plurality of tilting cables 59. Generally the tilting cables 59 are secured to the top of the major gin pole 48, before it is tilted to its vertical position, at anchor points 57 which can be terminal anchor points or sheared anchor points. There can be a single anchor point or multiple anchor points. Then the free ends of the tilting cables 59 can then be attached, after the tilting frame is tilted, to the support structure 22. These cables could alternately be connected to structure 22 prior to the tilting of major gin pole 48 (FIG. 12).

The tilting rigging/cables and the stabilizing rigging/cables work in tandem to safely tilt the tower up and keep it from falling over until the bottom connection is secured.

Figures 11A, 11B:
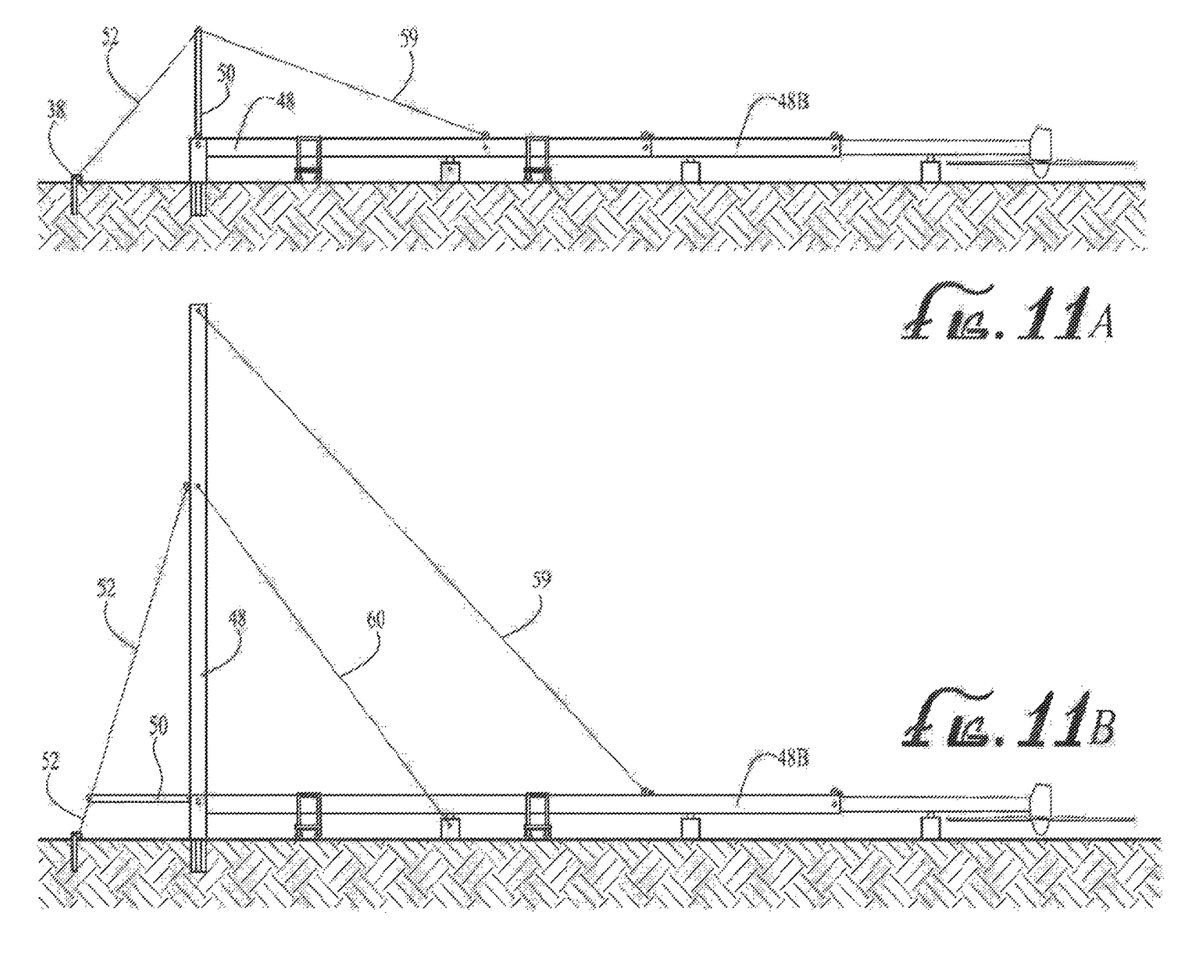
Figure 11C:
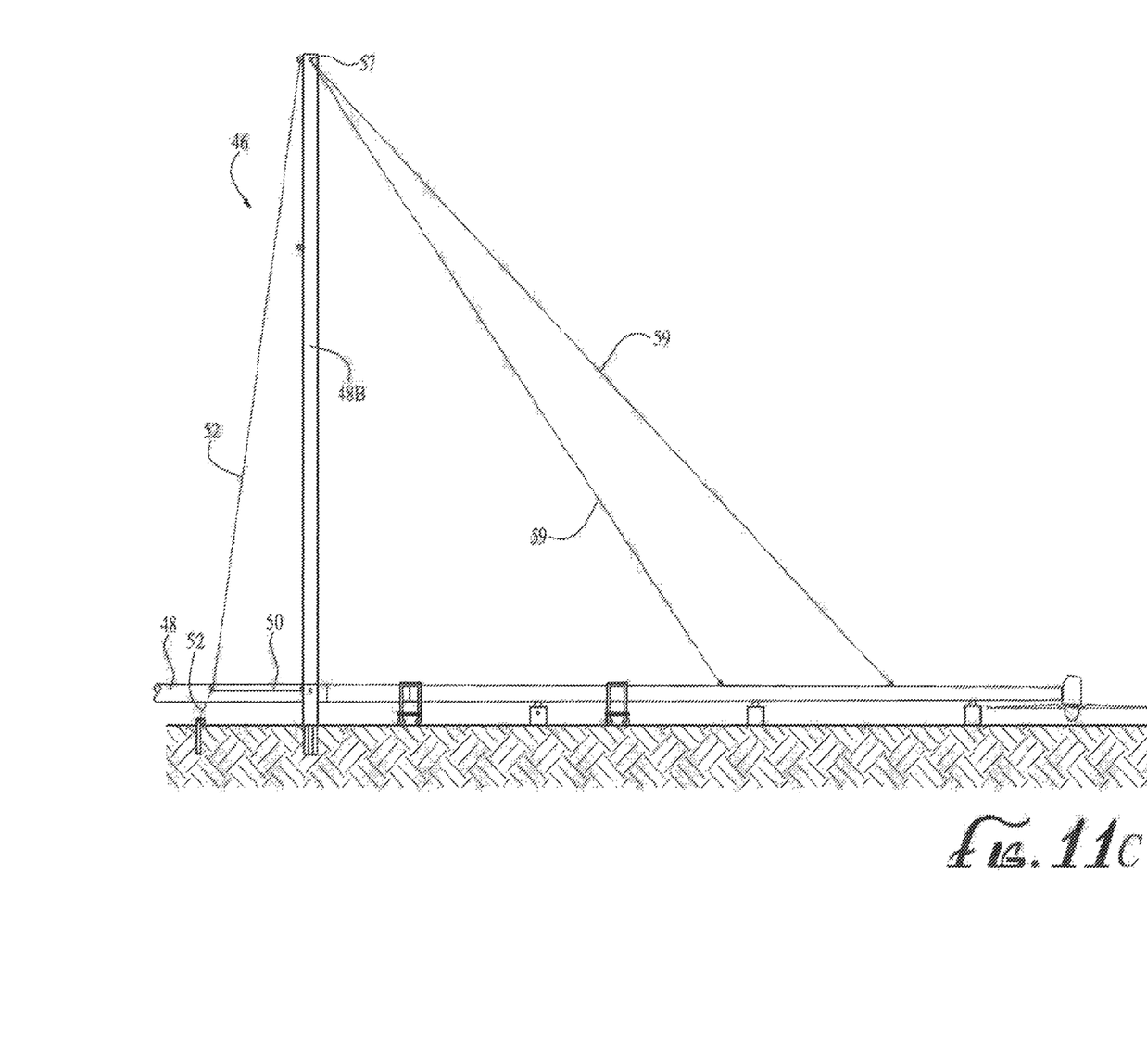

As demonstrated in FIGS. 11A-C, the tilting frame can have more than a single major gin pole, such as at least a first major gin pole 48 and a second major gin pole 48B. Furthermore, the gin pole configuration can be increased to a 3, 4, . . . , X stage gin pole tilting frame system to accommodate very high towers. Typically, each additional major gin pole 48B is longer than the first major gin pole 48. To erect the second major gin pole 48B, the tilting frame is tilted so that the longitudinal axis of the first major gin pole 48 is no longer substantially vertical and the longitudinal axis of the second major gin pole 48B is vertical. As depicted in FIG. 11B, each first major gin pole 48 is attached by a support cable 52 to an anchor and by a tilting cable 59 to the second major gin pole 48B. Stabilizing cables 60 support the first major gin pole 48. As demonstrated in FIG. 11C, after the last major gin pole 48B is raised vertically, the last major gin pole 48B is connected to the support structure 22 by a plurality of tilting cables 59 in the same manner the tilting cables 59 are connected to major gin pole 48. In the multi-major gin pole configuration, the support structure 22 is tilted to a vertical position in the same manner described below.

Figure 13:
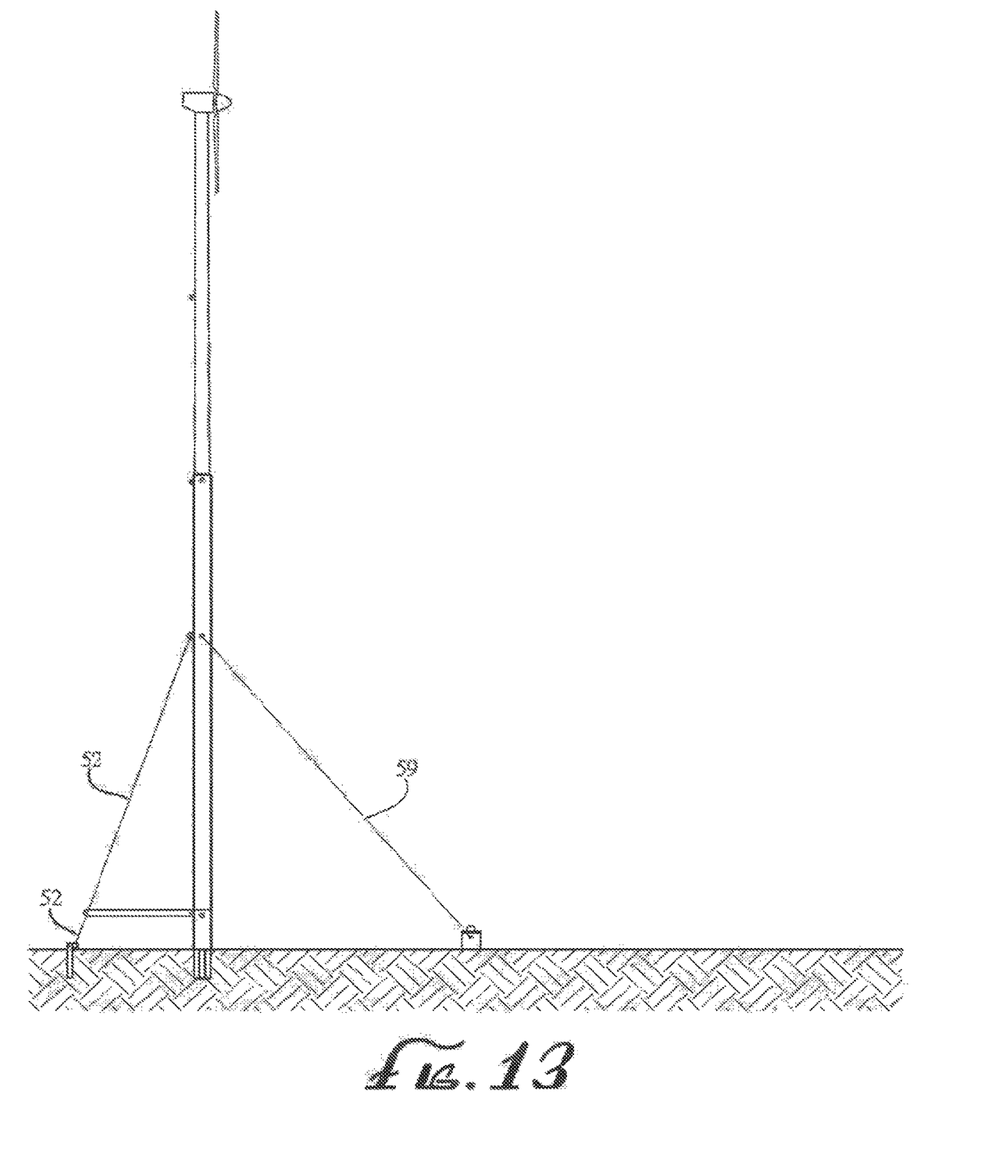

As demonstrated by FIGS. 12 and 13, again using a tilting power system (not shown), the support structure 22 is tilted to a vertical position, where it is secured in place, such as through use of one or more locking pins extending through the support structure and the pivot base 34, and/or can be secured with bolts or the like. It is also possible to weld it in place, but preferably that is not done, so that the tower can be tilted downwardly to a horizontal position for repair/or replacing the components. The gin poles can be tilted to any angle between 9 and 12 o'clock, i.e., vertical or beyond vertical by 90 degrees, during the tilting of the tower.

The hinged bottom section of the tower can consist of a double pinned connection. A first pin is used as a rotation point during the tilting of the tower while a second pin is inserted after the tower is tilted to the vertical position and is used to fasten and secure the tower. Alternatively, the tower can be rotated on one offset pin and the hinged section can be fastened and secured using a conventional bolted connection after the tower is tilted to its vertical position.

Figure 14:
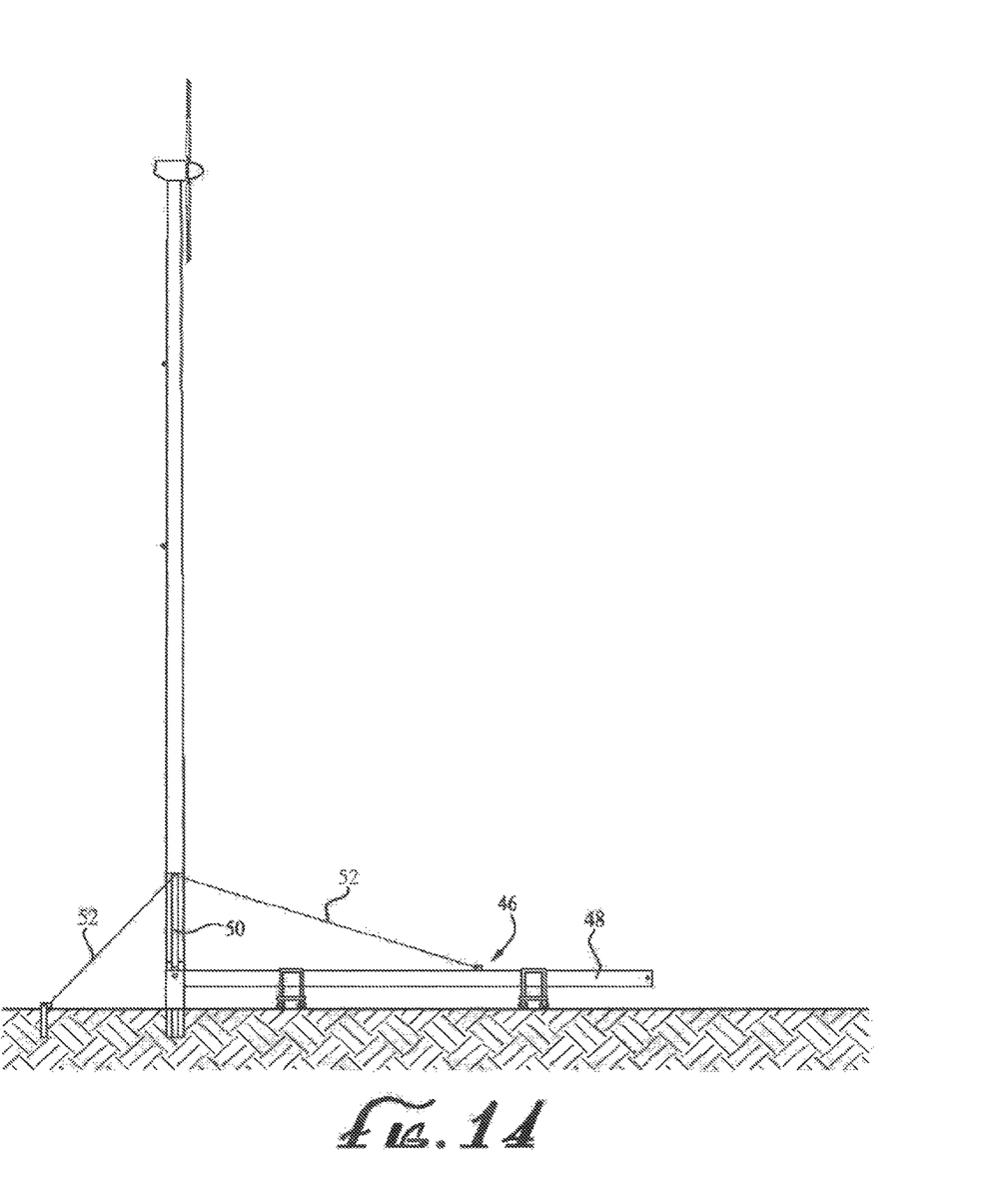
Figure 15:
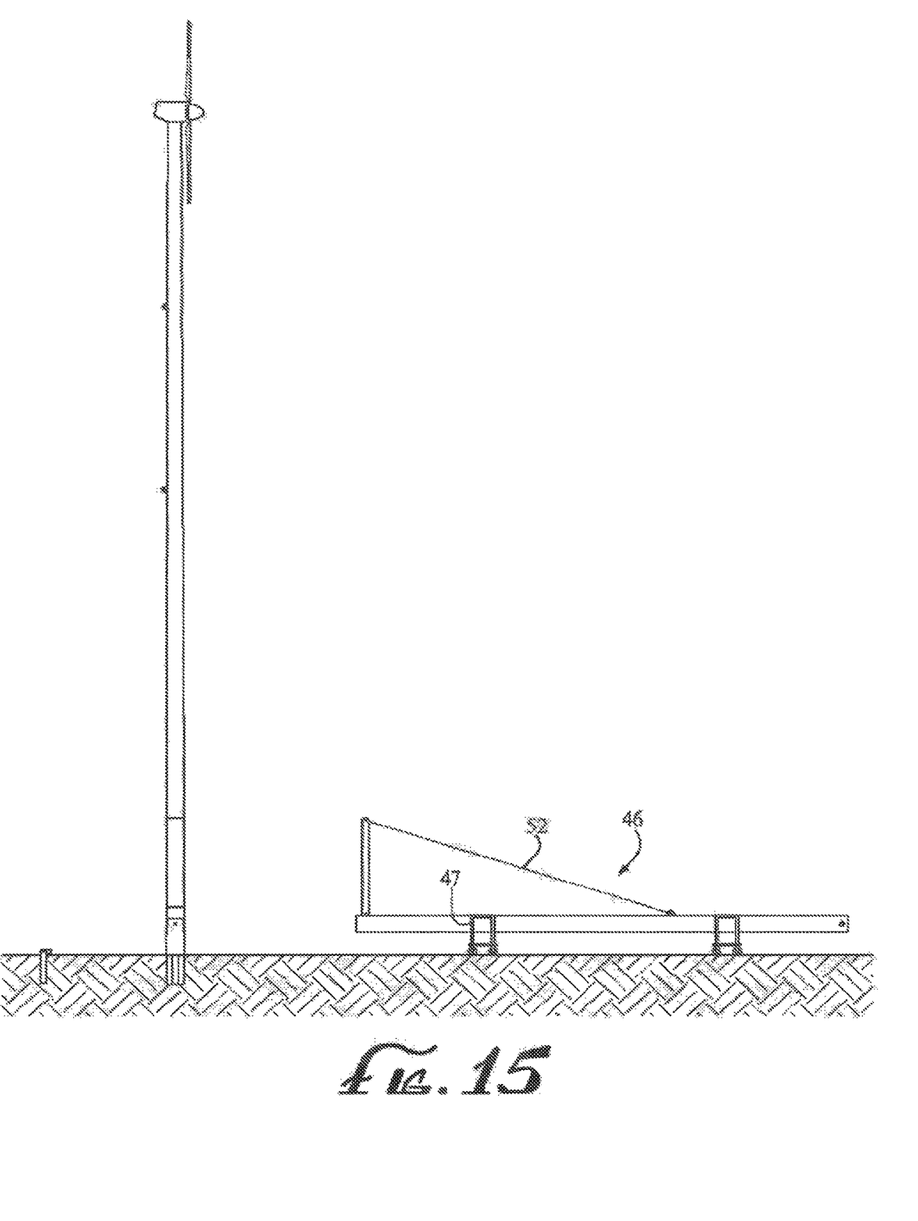

As shown in FIG. 14, the tilting frame 46 is then released from the vertical wind tower and tilted so that the major gin pole 48 is substantially parallel to the ground. Then the mobile tilting frame, as shown in FIG. 15, can be moved to another location for storage or for erecting another wind tower or repairing another wind tower. The two stage gin pole tilting frame assembly can be relocated without dismantling it. The relocation can be done using lifting equipment, straddle cranes, crawler carriers, heavy hauler, SPMT (self-propelled modular transporters) or by towing. The tilting frame can also be relocated under its own power, such as by utilizing a power pack and generator to propel steerable wheels.

An advantage of using this technique for erecting a wind tower with a mobile tilting frame is that the wind tower can easily be tilted back to a substantially horizontal position so that the blades, turbine, and/or top portion of the support structure can be repaired or replaced. This is effected by moving the mobile tilting frame 46 proximate to the foundation 32, connecting the minor gin pole 50 to the anchor 38 (which can be the foundation 53 (FIG. 9) of another wind tower), and then tilting the tilting frame so that the major gin pole 48 is substantially vertical and the longitudinal axis of the minor gin pole 50 is at an angle relative to the longitudinal axis of the major gin pole 48 of from about 45 degrees to 90 degrees. Then at least one tilting cable can be secured to the major gin pole 48 and the tower support structure, and using the tilting frame 46, the wind tower can be pivoted to an orientation substantially parallel to the ground.

A system according to the present invention has significant advantages over conventional techniques for erecting a wind tower. The mobile tilting frame can be reused for multiple wind towers, helping to decrease cost. Large cranes are not required. Also the system can be used for erecting towers substantially taller than conventional wind towers.

The invention has numerous other advantages over the prior art. Towers can be erected quickly due to the easy and rapid relocation process. The system can be scaled up and down to accommodate different tower heights. The system can be increased to multiple major gin poles in the tilting frame system to accommodate higher towers, specifically for erection of tall towers (over 150 meters). Furthermore, the method of the present invention allows for a lower overall project cost when compared to the prior art. Lastly, the method can be reversed to easily tilt the tower down for major turbine repairs, rebuild, replacement and upgrades.

Although the present invention has been described with a degree of particularity, it is understood that the present disclosure has been made by way of example and that other versions are possible. As various changes could be made in the above description without departing from the scope of the invention, it is intended that all matter contained in the above description or shown in the accompanying drawings shall be illustrative and not used in a limiting sense. The spirit and scope of the appended claims should not be limited to the description of the preferred versions contained in this disclosure.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means" or "step" clause as specified in 35 U.S.C. § 112.

The invention claimed is:

1. A combination comprising:
a) a tilting frame suitable for erecting a wind tower on a ground surface, the tilting frame comprising a major gin pole having a longitudinal axis and a minor gin pole having a longitudinal axis, the tilting frame being tiltable so that the major gin pole can tilt from a position substantially parallel to the ground surface to a substantially vertical position, the tilting frame having a first support cable connecting the major and minor gin poles and a second support cable securing the minor gin pole to an anchor, wherein the minor gin pole can pivot relative to the major gin pole and is at an angle of from about 45 to about 120 degrees relative to the longitudinal axis of the major gin pole; and
b) a wind tower comprising an elongated support structure, a turbine, and at least one blade on a ground surface, the support structure being attached to a foundation having a pivot base, the wind tower being tiltable from a substantially horizontal position to a vertical position,
wherein the tilting frame is tiltable so that the major gin pole can tilt from a position substantially parallel to the ground surface to a substantially vertical position, and wherein the tilting frame is proximate along its length to the wind tower when the tilting frame is in the position substantially parallel to the ground;

and wherein the major gin pole has a length that is from about 15% to about 25% of the length of the support structure.

2. The combination of claim 1, wherein the height of the wind tower is greater than 100 meters.

3. A combination comprising:
a) a tilting frame suitable for erecting a wind tower on a ground surface, the tilting frame comprising a major gin pole having a longitudinal axis and a minor gin pole having a longitudinal axis, the tilting frame having a first support cable connecting the major and minor gin poles and a second support cable adapted for securing the minor gin pole to an anchor, wherein the minor gin pole can pivot relative to the major gin pole such that the longitudinal axis of the minor gin pole can be at an angle of from about 45 to about 120 degrees relative to the longitudinal axis of the major gin pole; and
b) a wind tower comprising an elongated support structure, a turbine, and at least one blade on a surface, the support structure being attached to a foundation having a pivot base;
wherein the tilting frame is tiltable so that the major gin pole can tilt from a position substantially parallel to the ground surface to a substantially vertical position, and wherein the tilting frame is proximate along its length to the wind tower when the tilting frame is in the position substantially parallel to the ground.

4. The combination of claim 3, wherein the tilting frame further comprises at least two major gin poles.

5. The combination of claim 3, wherein the major gin pole of the tilting frame is longer than the minor gin pole of the tilting frame.

6. The combination of claim 3 wherein the minor gin pole of the tilting frame is 10% to 50% of the length of the major gin pole of the tilting frame.

7. The combination of claim 3, wherein the tilting frame is mobile.

8. The combination of claim 3, wherein the minor gin pole of the tilting frame can pivot relative to the major gin pole of the tilting frame so that the longitudinal axis of the minor gin pole is perpendicular to the longitudinal axis of the major gin pole.

9. The combination of claim 3, wherein the tilting frame further comprises a power system to tilt the major gin pole and minor gin pole.

10. The combination of claim 3, further comprising at least one tilting cable to connect or disconnect the tilting frame to the wind tower.

11. The combination of claim 3, further comprising wheels to move the tilting frame into a position proximate to the wind tower.

12. The combination of claim 3, wherein the major gin pole of the tilting frame has a length that is from about 10% to about 50% of the length of the support structure.

13. The combination of claim 3, wherein the major gin pole has a length that is from about 15% to about 25% of the length of the support structure.

14. The combination of claim 3, wherein the height of the wind tower is greater than 100 meters.

15. A combination comprising:
a) an anchor
b) a tilting frame suitable for erecting a wind tower on a ground surface, the tilting frame comprising a major gin pole having a longitudinal axis and a minor gin pole having a longitudinal axis, the tilting frame having a first support cable connecting the major and minor gin poles and a second support cable securing the minor gin pole to the anchor, wherein the minor gin pole can pivot relative to the major gin pole such that the longitudinal axis of the minor gin pole can be at an angle of from about 45 to about 120 degrees relative to the longitudinal axis of the major gin pole; and
c) a wind tower comprising an elongated support structure, a turbine, and at least one blade on a surface, the support structure being attached to a foundation having a pivot base;
wherein the tilting frame is tiltable so that the major gin pole can tilt from a position substantially parallel to the ground surface to a substantially vertical position, and wherein the tilting frame is proximate along its length to the wind tower when the tilting frame is in the position substantially parallel to the ground.

16. A combination comprising:
(a) a tilting frame suitable for erecting a wind tower comprising a major gin pole having a longitudinal axis and a minor gin pole having a longitudinal axis, the tilting frame having a first support cable connecting the major and minor gin poles and wherein the minor gin pole can pivot relative to the major gin pole such that the longitudinal axis of the minor gin pole can be at an angle of from about 45 to about 120 degrees relative to the longitudinal axis of the major gin pole, and wherein the tilting frame is finable so that the major gin pole can tilt from approximately a horizontal positon to a vertical position; and
(b) a wind tower comprising an elongated support structure and a turbine, the support structure being attached to a foundation having a pivot base,
wherein the tilting frame is tiltable so that the major gin pole can tilt from a position substantially parallel to the ground surface to a substantially vertical position, and wherein the tilting frame is proximate along its length to the wind tower when the tilting frame is in the position substantially parallel to the ground.

17. The combination of claim 16, wherein the tilting frame is positioned proximate to the pivot base and connected to the pivot base.

18. The combination claim 16, wherein the pivot base is built into the foundation.

19. The combination of claim 16, wherein the pivot base is secured to a second foundation separate from the wind tower foundation.

20. The combination of claim 16, comprising a power system for pivoting at least a portion of the wind tower into position.

21. The combination of claim 16, wherein the wind tower is locked into a substantially vertical position relative to the ground.

22. The combination of claim 16, wherein the wind tower is locked into a substantially vertical position.

* * * * *